J. C. CONKLIN.
Wheel-Harrow.
No. 35,487.
Patented June 3, 1862.
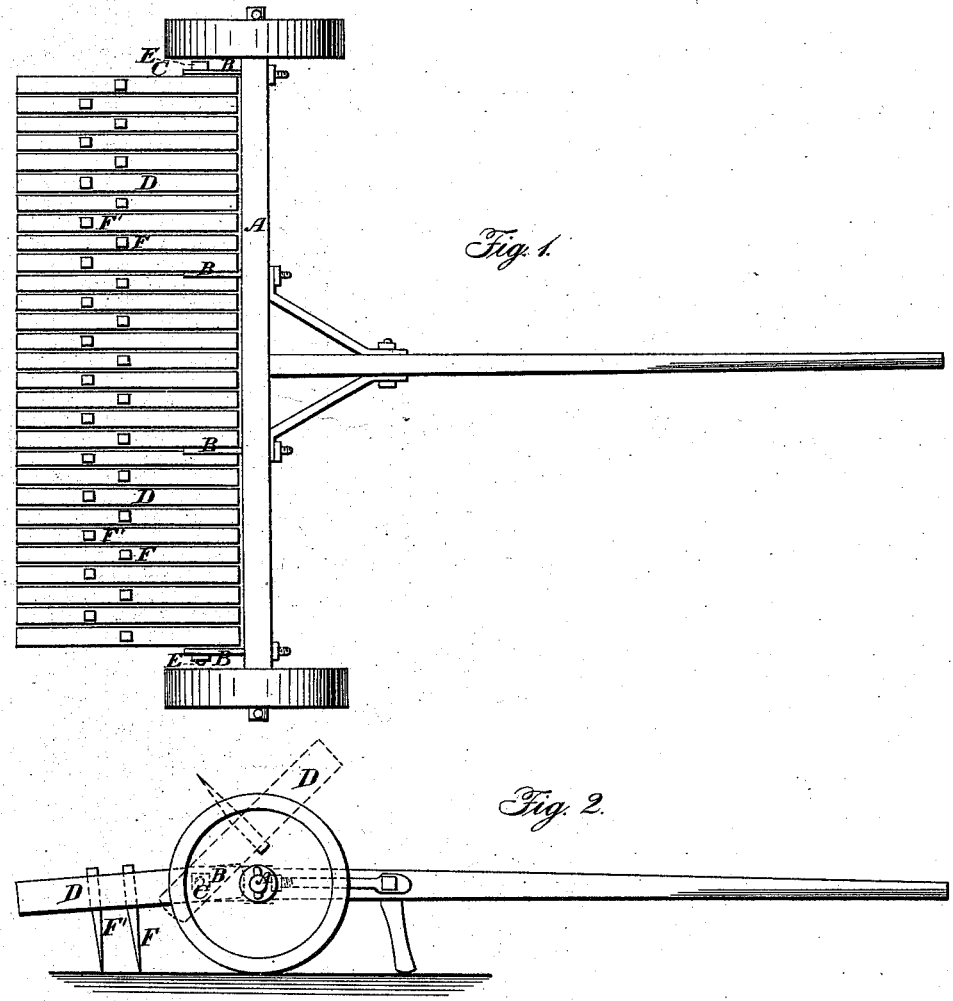
Witnesses:
G. A. C. Smith
Edw. J. Underwood
Inventor:
John C. Conklin
by T. S. Lambert, Atty

UNITED STATES PATENT OFFICE.

JOHN C. CONCKLIN, OF YORKTOWN, ASSIGNOR TO GEO. W. DEPEW, OF PEEKSKILL, NEW YORK.

IMPROVEMENT IN HARROWS.

Specification forming part of Letters Patent No. 35,487, dated June 3, 1862.

*To all whom it may concern:*

Be it known that I, JOHN C. CONCKLIN, of Yorktown, Westchester county, New York State, have invented a new and useful Improvement in Harrows; and I do hereby declare that the following is a full and exact description thereof, reference being had to the accompanying drawing and the letters of reference marked thereon.

The nature of my invention consists in applying the beams of a harrow to which the teeth are attached to an axle mounted on wheels in such a way by joints that each tooth or couple of teeth can move up and down independently of the rest in the harrow, and can be thrown over onto the axle for the purpose of transportation or to avoid any obstacle; and my invention also permits a seat to be attached to a harrow, thereby enabling the agriculturist to use this valuable apparatus with comparative ease.

To enable those skilled in the appropriate arts to make and use my invention, I will proceed to describe its construction and operation.

I construct an axle of a length and size in accordance with the force to be applied to the machine, and apply wheels of corresponding strength. The axle may be of metal or wood, and the wheels may vary in height, according to the judgment of the artificer. A pole or thills should be attached to the front side of the axle. To the back part of it three or more arms, of either wood or metal, should be firmly attached, and project sufficiently for the purpose of fastening the teeth-bars to the arms.

It will usually be best to have the axle A of wood, mortised at distances of three inches to receive the arms B B, which should be three inches square by about a foot long. Near the middle of the arms holes should be bored through parallel to the axle, as seen at C.

D D represent teeth-bars fitting between the arms B B. The bars are about three inches square and eighteen inches long, have holes corresponding to those in the arms, and are kept in place by a rod passing through the holes in the arms and bars, as seen at C, where E represents the head of the rod, the other end being near E'.

At or near the outer end of the teeth-bars, and upon one or both sides of them, either opposite to each other or otherwise, teeth F F', either cast or wrought, metallic or wooden, permanent or movable, crooked or straight, are fastened by any of the ordinary devices.

The bars may be attached to the axle by hinges or by two staples, or other corresponding device.

Thus constructed the teeth of the harrow are in the most perfect manner possible able to act upon the most uneven ground, tearing every portion of it or covering every kernel of grain evenly, while they can be in a part of the harrow thrown over onto the axle to avoid an obstacle, or all of them can be thrown onto it for the purpose of transportation.

What I claim as my invention, and desire to secure by Letters Patent, is—

The application of the teeth-bars of a harrow to an axle in such a manner that each tooth or pair of teeth may move independently of the rest, substantially as set forth.

JOHN C. CONCKLIN.

Witnesses:
W. A. HUNT,
T. S. LAMBERT.